Figure 1:
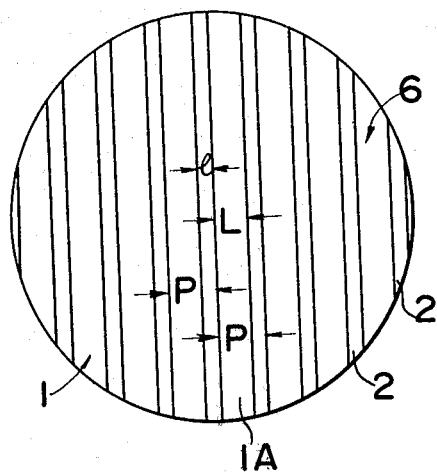

United States Patent [19]
Fukuda et al.

[11] 3,961,956
[45] June 8, 1976

[54] METHOD FOR PRODUCTION OF AND DISTINCTION BETWEEN COMBINED VALIDIFICATION AND IDENTIFICATION PHOTOGRAPHS

[75] Inventors: Susumu Fukuda; Kuniomi Abe, both of Nishinomiya, Japan

[73] Assignee: Fuji Photo Film Co., Ltd., Minami-ashigara, Japan

[22] Filed: May 15, 1975

[21] Appl. No.: 578,053

Related U.S. Application Data

[63] Continuation of Ser. No. 388,861, Aug. 15, 1973.

[30] Foreign Application Priority Data
Oct. 25, 1972 Japan............................ 47-106782
Sept. 26, 1972 Japan.............................. 47-96364

[52] U.S. Cl.......................................... 96/40; 96/41; 96/42; 96/81; 96/27 R; 283/6; 283/7; 283/8 R; 283/8 B; 40/2 R; 40/2.2; 40/5; 350/167; 352/38; 352/46
[51] Int. Cl.² ........................ G03C 9/00; G03C 5/04
[58] Field of Search ............... 96/40, 41, 42, 43, 81, 96/27 R, 27 E; 283/7, 8 R, 8 B, 6; 40/2, 2.2, 5; 352/38, 46; 350/167

[56] References Cited
UNITED STATES PATENTS

| | | | |
|---|---|---|---|
| 834,048 | 10/1906 | Deeks..................................... | 96/40 |
| 3,300,308 | 1/1967 | Jemseby................................. | 96/81 |
| 3,332,775 | 7/1967 | Mandler................................. | 96/40 |
| 3,675,948 | 7/1972 | Wicker................................... | 283/8 B |
| 3,784,380 | 1/1974 | Compare ............................... | 96/41 |

*Primary Examiner*—Edward C. Kimlin
*Attorney, Agent, or Firm*—Sughrue, Rothwell, Mion, Zinn & Macpeak

[57] ABSTRACT

A method production of a composite photograph containing at least two images, i.e. a mark image and a holder image, and a method for distinguishing images in said composite photograph, said photograph being composed of alternate strips containing elements of the holder identify photograph and strips containing elements of validity check mark photograph, all strips being disposed at equal intervals from one another, and said photograph of the holder being hidden by said check mark photograph when viewed normally, and to be discernible only when viewed through a lenticular lens.

4 Claims, 5 Drawing Figures

# METHOD FOR PRODUCTION OF AND DISTINCTION BETWEEN COMBINED VALIDIFICATION AND IDENTIFICATION PHOTOGRAPHS

This is a continuation of application Ser. No. 388,86/, filed Aug. 15, 1973.

The present invention relates to a method for production of a composite photograph which is intended to be affixed to and verify the validity of a document, and which is a composition containing a photograph of a check mark and a photograph identifying the owner, or holder of the document, said photograph of the holder being intended to be hidden by said check mark photograph and to be discernible only when viewed through a special means, but not when viewed normally, and to a method for distingushing said component photograph from one another by lenticular lens.

It is normal practice to affix a pattern, sign, or mark to credit cards, passes, or similar documents to affirm the validity of the documents. Also, in order to counter misappropriation and misuse of such documents, it is often desired to affix to a document a composite photograph containing a validity check mark and a photograph identifying the holder of the document, the identifying photograph being hidden by the mark, and not discernible when viewed normally, but becoming apparent when viewed through a special material such as lenticular lens.

According to a known method for the production of such composite photograph a lenticular lens is placed on a sheet of photosensitive material, the material is exposed to a first image at a certain angle through the lenticular, the lenticular is moved to a new position on the photosensitive sheet and then the photosensitive sheet is exposed to another image through the lenticular, the second image thus being projected on to the previously unexposed portions of the photosensitive sheet, and the two images being formed on different portions of the photosensitive sheet. To distinguish the two images there is employed a lenticular that is the same type as that used in the production of the composite photograph. The lenticular is placed on the surface of the photograph and moved to different positions wherein the two images become apparent when viewed through the lenticular.

The conventional method has the advantage that the only special equipment required is a lenticular, but also has disadvantages. For example, since the photosensitive material is exposed through a lenticular, it is difficult to avoid distortion of the projected image, and interference refraction from opposite sides of the lenticular, and there may be lack of focus in the completed photograph. Also, if it is attempted to increase lens aperture to increase the effectiveness of the validity mark image in hiding the identity photograph, the identity photograph may be completely overlaid, or the composite photograph as a whole is very blurred.

It is accordingly an object of the present invention to overcome the disadvantages inherent in conventional methods and offer a method for the production of composite photographs for verification of the validity of documents and identification of the holders of documents, which contain different images, which are clearly distinguished from one another, and one of which is effectively hidden by the other, or others, when normally viewed.

It is another object of the present invention to offer a method for the production of composite, verification and identification photographs which requires only simply, cheaply manufactured and easily manipulated equipment.

It is a further object of the present invention to offer a simple method for distinguishing component images in a composite photograph.

According to the present invention, there is provided a 1st board comprising a plurality of slats disposed parallel to one another at an even pitch, and separated by gaps, which are less wide than the slats, and a 2nd similarly constructed board in which the width of the slats generally corresponds to that of the gaps of the 1st board and the width of the gaps generally correspond to that of the slats of the first board. The 1st board is placed flat on a sheet of photosensitive material, and a 1st image, for example, of the holder of a credit card, or similar document, is projected on to the photosensitive sheet. The first image is therefore formed in those portions of the photosensitive sheet lying opposite the gaps in the first board. Next, a second image, for example, of a validity check mark, is projected on the photosensitive sheet through the second board, which is placed flat on the photosensitive sheet so that its slats cover the exposed portions thereof. The composite photograph thus produced contains the image of a holder of a document and the image of a mark certifying the validity of the document, each image being formed in a series of seperate striate portions of the photosensitive sheet. The striate portions containing the image of the holder are generally similar to or narrower than those containing the validity mark image, and when the photograph is normally viewed the holder image is hidden by the validity mark image. To render the holder image apparent there is provided a lenticular lens having plano-convex portions disposed at the same pitch as the slats of the first board. The lens is placed on the composite photograph so that the plano-convex portions thereof are aligned with the striate portions containing the holder image, which becomes apparent when viewed through the lens in this position.

In another embodiment of the invention, the width of the slats of the first board are made at least twice the width of the gaps, whereby, after production of a holder image on a sheet of photosensitive material, there is sufficient unexposed area of the photosensitive sheet for at least two other images of check marks, which hide the holder image even more effectively, and further improve the efficiency of the composite photograph produced.

Figure 2:
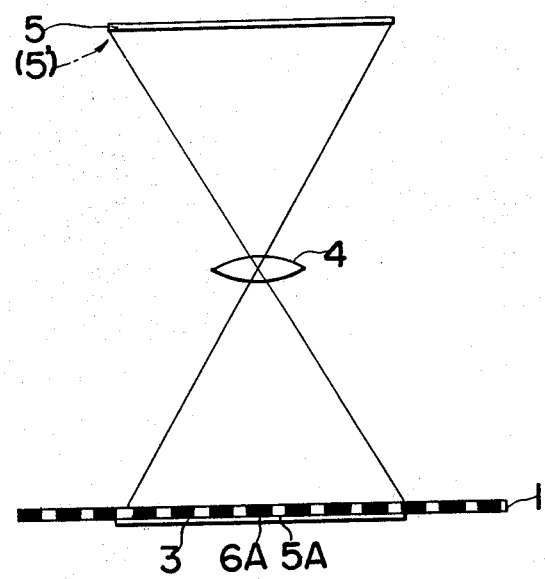
Figure 3:
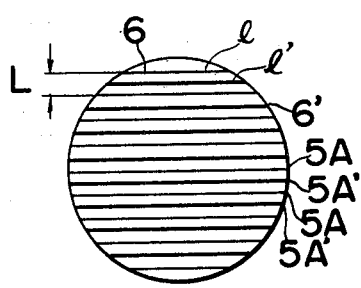
Figure 4:
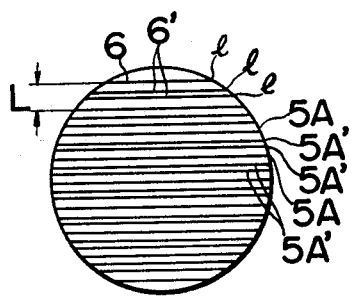
Figure 5:
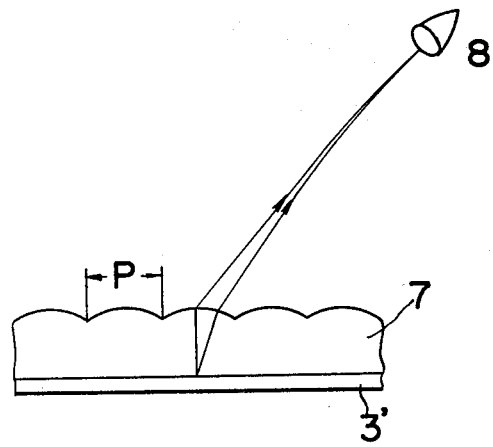

The present invention will be described hereinbelow, by way of example, with reference to the attached drawings, in which;

FIG. 1 is a partial, plane view, on an enlarged scale, of a slatted board to be used for production of a composite photograph according to the present invention, FIG. 2 is an enlarged side-elevational view, partially in section, for the purpose of illustrating schematically the set up of equipment for production of a compostie photgraph according to the present invention, FIG. 3 is a partial, plane view, on an enlarged scale, of a composite photograph produced according to the method of the present invention, FIG. 4 is a similar view of FIG. 3, but showing a composite photograph produced according to another method of the present invention, and FIG. 5 is an enlarged side-elevational view, partially in section, for the purpose of illustrating schematically a method for distinguishing component images of a composite photograph according to the present invention.

Before describing the specific embodiments of the present invention, it is to be noted that like parts are designated by like reference numeral throughout the several views of the accompanying drawings.

Referring to FIG. 1, there is shown a first pallet-like board 1, which is composed of a plurality of slats 1A made of plastic or other suitable material. The slats 1A all possess the same width L, are disposed parallel to one another at equal intervals of one pitch P, and are separated by gaps 2. Each gap 2 has a width $l$ that is less than the slat width L. The first board $l$ is employed as a mask to control light passing there-through during the exposure of a sheet of photosensitive material 3.

The photosensitive sheet 3 may be any conventional photographic printing material, and is for the purpose of production of a document verification photograph, which contains, for example, both the photograph of the holder of a credit card of or similar document, and the photograph of a special check mark. The first board $l$ is mounted in close contact with and flat on the photosensitive sheet 3, as shown in FIG. 2. There is also provide the photographic image 5, which is in the form of a film negative or plate, and which represents an object or person to be identified, such as, for example, the holder of a credit card or pass. This photographic image is referred to hereinbelow as the holder image 5. The holder image 5 is positioned above and parallel to the assembled first board $l$ and photosensitive sheet 3 with a certain distance therebetween. A focusing lens 4 is positioned between the holder image 5 and the photosensitive sheet 3, at a suitable distance from the holder image 5, and so that it may focus the holder image 5 on the surface of the photosensitive sheet 3. There is further provided a light source (not shown in Figures) for exposure of the photosensitive sheet 3 and projection of the holder image 5 thereon in a known manner. If the holder image 5 is transparent, the light source is positioned behind the holder image 5 relative to the photosensitive sheet 3. If the holder image 5 is not transparent, the light source is, of course, positioned obliquely to the front of the holder image 5.

When the above-described elements have been set up in the above-described manner, the photosensitive sheet 3 is exposed for a suitable length of time to the holder image 5, whereby a holder identity photograph 5A may be produced thereon.

During this exposure, the photosensitive sheet 3 is partially masked by the first board 1, and so the resulting holder identity photograph 5A is decomposed into a plurality of striate portions, or strips 6, as illustrated in FIG. 3. Each strip 6 has the same width $l$ as the gaps 2 of the first board 1, and is separated from neighbouring strips 6 by unexposed strips 6A having the same width L as the slats 1A. From considerations of visual effect in the completed verification photograph for a human being, the width $l$ of the gaps 2 should be below 0.45 mm; if the breadth $l$ is made less than 0.25 mm, there is produced an image that appears almost continuous without breaks.

There is also provided a mark image 5', which is the photographic image of a pattern, sign, or mark, which is used to certify the validity of a credit card, pass, or similar document, and which is intended to hold the holder identity photograph 5A. The mark image 5' is positioned in the same location as the holder image 5, whereby the same photosensitive sheet 3, but different portions thereof, may be exposed to the mark image 5'. The light source and lens 4 are as employed in the production of the holder identity photograph 5A, but in projection of the mark image 5' the photosensitive sheet 3 is partially masked by a second board 1'.

The second board 1' is fabricated in a similar manner to and with the same external dimensions as the 1st board 1, and is composed of a plurality of slats 1A', which are disposed parallel to one another and at equal intervals of one pitch P, which is the same pitch P of the first board slats 1A. The width L' of the second board slats 1A' is less than the width L of the first board slats 1A and is greater than the width L of the first board gaps 2, and the width $l$ of the gaps 2', between the second board slats 1A', is correspondingly greater than the width $l$ of the 1st board gaps 2 and is less than the width L of the first board slats 1A. The 2nd board 1' positioned in close, flat contact with the photosensitive sheet 3 in such a manner that the slats 1A' lie over the exposed strips 6 of photosensitive sheet 3, and the gaps 2' lie within the unexposed strips 6A, that is, portions having been overlayed by the first board slats 1A.

The photosensitive sheet is then subjected to a second exposure, in which the mark image 5' is projected thereon. The mark image 5' is projected through the gaps 2' only, and so produces a validity check mark photograph 5A' which is decomposed into strips 6A. The resultant document verification photograph on the sheet 3 is therefore composed of alternate strips 6, containing elements of the holder identity photograph 5A, and strips 6', containing elements of the validity check mark photograph 5A'. The strips 6 are disposed at equal intervals from one another, and the other strips 6' also are disposed at equal intervals from one another. The strips 6' have a width $l$ that is greater than the width $l$ of the strips 6, and therefore, when the document verification photograph is viewed normally, the validity mark photograph 5A' is immediately apparent, and the holder identity photograph 5A is effectively hidden.

Needless to say, the exact positioning of the first and second boards 1, 1' relative to the photosensitive sheet 3, may be easily effected by a conventional means such as a standard printing box by which the first and second boards 1, 1' may be clamped to the photosensitive sheet 3. Also, it is not, of course, essential that the production of the holder identity photograph 5A precede that of the validity check mark photograph 5A', but the photographs may be produced in any order.

FIG. 4 illustrates a second embodiment of the invention, in which the maximum width $l$ of the gaps 2 between the slats 1A of the first board 1 is, for example, made less than ½ the width L of the slats 1A, and the widths of the slats 1A' and gaps 2' of the second board 1' are made correspondingly smaller or greater, respectively. The method of production of photographs in the second embodiment is the same as that in the first embodiment. With the equipment of the second embodiment, however, each strip 6' containing part of a validity check mark photograph 5A' on the photosensitive sheet 3 is double the width of a strip 6 containing part of the holder identity photograph 5A.

In other words, between each pair of strips 6 in a completed document verification photograph there is provision of enough space for two different strips 6' which may be used to contain the elements of two different validity check mark photographs 5A'. For the best effect, the strips 6 containing elements of the holder identity photograph 5A should be as widely spaced as possible to the other strips containing elements of the validity check mark photograph. In this case, the photosensitive sheet 3 is exposed to two different check marks 5', as well as to the holder image 5, and the resultant document verification photograph is composed of alternate strips containing the elements of the holder identity photograph, of a first validity check photograph, and of a second validity check photograph, and the holder identity photograph 5A is even more effectively hidden by the validity check mark photographs 5A. If two validity check marks are not required, the equipment of the second embodiment may of course be used to produce a document verification photograph that is generally the same as that produced by the equipment of the first embodiment.

There will follow hereinbelow a description of examination of the above-described document verification photograph and of the method of distinguishing the holder identity photograph from the validity check mark photograph.

When a credit card, or similar document, to which the above-described verification photograph is affixed, is examined, the validity check mark is immediately apparent, but the identity photograph of the holder of the document cannot be discerned. In order to render the holder identity photograph 5A visible, there is provided a conventional lenticular lens 7 having the shape of a multi-convex lens. The plano-convex portions of the lenticular lens 7 are disposed at equal intervals of one pitch P, which is the same as the pitch P of the slats 1A of the board 1 used in the production of the holder identity photograph 5A. The lenticular lens 7 is laid on the document verification photograph, and then moved slightly across the surface of the verification photograph, so as to bring the plano-convex portions of the lenticular 7 into alignment with the strips 6 composing the holder identity photograph 5A.

When the lenticular lens 7 is brought into this position, the holder identity photograph 5A is made visible therethrough, and it may be ascertained whether or not the person presenting the document for examination is the true owner. In other words, the component parts of the verification photograph may be rapidly and easily distinguished one from the other, the velidity check mark photograph 5A being viewed directly, and the holder identity photograph 5A being viewed through the lenticular lens 7. It is of course, possible to view the validity check mark photograph also through the lenticular lens 7, in which cases the details thereof are rendered even clearer than in direct viewing.

As is clear from the above description, according to the present invention, a photograph for validification of a document and verification of the identity of a holder of the document is produced by exposure of a sheet of photosensitive material through a slatted board, and there is therefore no risk of distortion of photographic images, nor of overlay of one image by another. Instaed, a holder identity photograph and a security check mark photograph are produced on the same sheet of photosensitive material, but kept entirely separate from one another on different strips of the photosensitive sheet. By viewing the verification photograph through a lenticular lens, the security check mark photograph and the holder identity photograph each appears as an entirely distinct continuous image, but the verification photograph normally appears as a single image, in which the holder identity photograph is effectively hidden. The invention also makes it possible to include two or more validity check marks in a document verification photograph, or to vary the proportions of the area covered by different images, as required.

The present invention thus offers the advantages that in document verification photographs clearer distinction between component parts is made, that holder identity photographs are more effectively hidden, that a variety of validity check may be provided, and that production is rendered simpler.

Although the present invention has been fully disclosed by way of the preferred embodiments thereof, it is to be noted that various changes and modifications are apparent to those skilled in the art. For example, the second boards of the first and second embodiments may be fabricated as the same construction of the corresponding first boards. In this case, the first board is moved at least once more, so that said first board slats cover exposed portions of said photosensitive sheet, and said photosensitive sheet is exposed at least once more and at least one more image is projected thereon. Therefore, unless otherwise they departs from the true scope of the present invention, they should be constructed as included therewithin.

What is claimed is:

1. A method of making an identification image in the form of a compositive photograph containing at least two different images, one of which is a holder image and the other of which is a check image, with the holder image not being clearly discernible when viewed normally because the check image dominates the view, which method comprises:

projecting a first holder image on a sheet of photosensitive material through a first board formed of a plurality of slats disposed parallel to one another at an even pitch and separated by gaps, said gaps being less wide than the slats and being no greater than 45 mm in width, with said slats being approximately at least twice as wide as the width of said gap, with said board being positioned in close contact with said photosensitive sheet, whereby, only said photosensitive sheet portions defined by said gaps of said first board are initially exposed, and projecting a second check image on said photosensitive sheet through a second board, which is positioned in close contact with said photosensitive sheet, with said second board slats being at least as wide as said gaps of said first board and lying over the previously exposed portions of said photosensitive sheet and having gaps between said second board slats which are at least twice as wide as the gaps of said first board and being aligned with unexposed portions thereof, whereby, only said photosensitive sheet portions defined by said gaps between said second board slats are exposed to form a compositive photograph containing said first and second images, said first image being contained in thin striate portions corresponding to said photosensitive sheet portions exposed through gaps between said first positioned board slats, and said second image being contained in thin, straite portions corresponding to said photosensitive sheet portions exposed through said gaps between said second positioned board slats, whereby, said second image is readily viewable and dominates said view, and said first image becomes apparent and dominates said view only when viewed through a lenticular lens having plano-convex portions disposed at the same pitch as said slats of said first board when placed in close contact with said composite photograph and moved into a position in which said lens plano-convex portions are aligned with respective striate portions containing said first image.

2. A method as defined in claim 1, wherein the width of said first board slats is approximately four times that of the gap between said first board slats, said photosensitive sheet is initially exposed to said first image and said second board slats are three times the width of a first board gap and said second board is moved sequentially into two positions to effect exposure of two additional different check images on respective nonexposed portions of said photosensitive sheet, each in thin striate portions whose width is twice that of the thin striate portion forming said first image.

3. A method of making an identification image in the form of a composite photograph containing at least two different images, one of which is a holder image and the other of which is a check image, with the holder image not being clearly discernible when viewed normally because the check image dominates the view, which method comprises:

projecting a first holder image onto a sheet of photosensitive material through a first board formed of a plurality of slats disposed parallel to one another at an even pitch and separated by gaps, said gaps being less wide than the width of said slats and having a dimension no greater than 45 mm, with said board positioned in close contract with said photosensitive sheet, whereby only said photosensitive sheet portions defined by said gaps of said first board are initially exposed, and projecting a second check image onto said photosensitive sheet through a second board which comprises a plurality of slats disposed parallel to one another at the same even pitch as that of said first board slats and separated by gaps, with said second board slats being less wide than the first board slats and the gaps between said second board slats being at least twice as wide as the gaps between said first board slats, with said second board being positioned in close contact with said photosensitive sheet and with said second board slats lying over exposed portions of said photosensitive sheet and with the gaps between the second board slats being aligned with unexposed portions of said photosensitive sheets, whereby; only said photosensitive sheet portions aligned with said gaps of said second board are exposed to form a composite photograph containing said first and second images, said first image being contained in thin striate portions corresponding to said photosensitive sheet portions exposed through gaps between said first board slats and said second image being contained in thin striate portions corresponding to said photosensitive sheet portions exposed through said gaps between said second board slats, said first image becoming apparent only when viewed through a lenticular lens having plano-convex portions disposed at the same pitch as said slats of the first and second boards when placed in close contact with said composite photograph and moved into a position in which said lens plano-convex portions are aligned with said striate portions containing said first image.

4. A method as claimed in claim 3, wherein the width of each gap between the second board slats is at least twice that of each gap between said first board slats and the slats of said second board are each three times the width of said first board gap, said photosensitive sheet is initially exposed to a first image which is projected through said first board and said second board is moved twice so that the second board slats cover sequentially exposed portions of said photosensitive sheet and said photosensitive sheet is thereby further exposed to two additional, different images projected thereon, through said second board.

* * * * *